US008977488B2

(12) United States Patent
Pierfelice

(10) Patent No.: US 8,977,488 B2
(45) Date of Patent: Mar. 10, 2015

(54) SYSTEMS, METHODS AND VEHICLES FOR PROVIDING ROUTE GUIDANCE

(75) Inventor: Jeffrey E. Pierfelice, Canton, MI (US)

(73) Assignee: Toyota Motor Engineering & Manufacturing North America, Inc., Erlanger, KY (US)

(*) Notice: Subject to any disclaimer, the term of this patent is extended or adjusted under 35 U.S.C. 154(b) by 302 days.

(21) Appl. No.: 13/534,795

(22) Filed: Jun. 27, 2012

(65) Prior Publication Data
US 2014/0005925 A1 Jan. 2, 2014

(51) Int. Cl.
G01C 21/00 (2006.01)
G01C 21/36 (2006.01)
G01C 21/34 (2006.01)

(52) U.S. Cl.
CPC ........ *G01C 21/3632* (2013.01); *G01C 21/3438* (2013.01); *G01C 21/3446* (2013.01); *G01C 21/3415* (2013.01); *G01C 21/34* (2013.01)
USPC ............ 701/425; 701/411; 701/428; 701/431

(58) Field of Classification Search
CPC ............... G01C 21/34; G01C 21/3415; G01C 21/3446; G01C 21/3438
USPC .......................... 701/425, 410, 428, 411, 431
See application file for complete search history.

(56) References Cited

U.S. PATENT DOCUMENTS

| 5,999,892 | A | 12/1999 | Fan | |
|---|---|---|---|---|
| 6,253,150 | B1* | 6/2001 | Nakamura | 701/409 |
| 7,155,339 | B2 | 12/2006 | Tu | |
| 7,849,944 | B2 | 12/2010 | DeVault | |
| 7,924,173 | B2 | 4/2011 | Behr et al. | |
| 7,953,544 | B2* | 5/2011 | Amemiya et al. | 701/117 |
| 8,332,141 | B2* | 12/2012 | Couckuyt | 701/430 |
| 8,346,465 | B2* | 1/2013 | Panganiban et al. | 340/988 |
| 8,626,230 | B2* | 1/2014 | Raab | 455/550.1 |
| 2001/0041562 | A1* | 11/2001 | Elsey et al. | 455/414 |
| 2003/0060971 | A1* | 3/2003 | Millington et al. | 701/206 |
| 2008/0004803 | A1* | 1/2008 | Kikuchi | 701/209 |
| 2010/0114472 | A1 | 5/2010 | Oumi | |
| 2010/0280713 | A1* | 11/2010 | Stahlin et al. | 701/41 |
| 2011/0153185 | A1* | 6/2011 | Aben et al. | 701/200 |
| 2012/0075337 | A1* | 3/2012 | Rasmussen et al. | 345/629 |
| 2012/0101728 | A1* | 4/2012 | Kudo | 701/540 |
| 2012/0123672 | A1* | 5/2012 | Kojima et al. | 701/410 |
| 2012/0128217 | A1* | 5/2012 | Satoh | 382/113 |
| 2012/0150432 | A1* | 6/2012 | Kono et al. | 701/428 |
| 2012/0271540 | A1* | 10/2012 | Miksa et al. | 701/409 |

(Continued)

FOREIGN PATENT DOCUMENTS

EP 1980822 A1 * 10/2008
WO WO 2009122633 A1 * 10/2009

*Primary Examiner* — Tuan C. To
(74) *Attorney, Agent, or Firm* — Dinsmore & Shohl LLP

(57) ABSTRACT

In one embodiment, a navigation system may include one or more processors, a display, a satellite antenna, one or more memory devices, and map data. A route distance icon can be presented on the display, automatically, when the current location is not coincident with the route and the start offset distance is less than a predetermined distance. The route distance icon can provide the on-the-route distance. A geodesic distance icon can be presented on the display, automatically, when the current location is not coincident with the route and the start offset distance is greater than the predetermined distance. The geodesic distance icon can provide a geodesic distance from the current location to the destination.

20 Claims, 5 Drawing Sheets

(56) References Cited

U.S. PATENT DOCUMENTS

| | | | |
|---|---|---|---|
| 2013/0035858 A1* | 2/2013 | Sumizawa et al. | 701/533 |
| 2013/0073197 A1* | 3/2013 | Hirai et al. | 701/428 |
| 2013/0158860 A1* | 6/2013 | Gum | 701/410 |
| 2013/0204525 A1* | 8/2013 | Pfeifle | 701/533 |
| 2013/0218449 A1* | 8/2013 | Hymel et al. | 701/408 |

* cited by examiner

SYSTEMS, METHODS AND VEHICLES FOR PROVIDING ROUTE GUIDANCE

TECHNICAL FIELD

The present specification generally relates to systems, methods and vehicles for providing route guidance and, more specifically, to systems, methods and vehicles for providing route guidance according to a global position system.

BACKGROUND

Global positioning system (GPS) signals can be utilized for determining a current location of a device capable of receiving GPS signals. The device can be configured to cross-reference the current location with a map to provide navigational information. For example, a route between two locations on the map can be determined. Many vehicles can include an integral GPS device that provides navigational instructions based upon data contained in a map (e.g., roadways, addresses, latitude and longitude, or the like). The navigation can be provided as images and audible directives for traveling along the route (e.g., turn-by-turn navigation). The map can be periodically updated to include new roads or additional detail. However, in practice, many maps can include outdated data or fail to include comprehensive data with respect to every possible location that the vehicle can traverse.

Accordingly, a need exists for alternative systems, methods and vehicles for providing route guidance according to a global position system.

SUMMARY

In one embodiment, a navigation system may include one or more processors, a display, a satellite antenna, one or more memory devices, and map data. The display can be communicatively coupled to the one or more processors. The satellite antenna can be communicatively coupled to the one or more processors. The satellite antenna can receive a signal from one or more global positioning system satellites. The one or more memory devices can be communicatively coupled to the one or more processors. The map data can be stored in the one or more memory devices. The one or more processors can execute machine readable instructions to transform the signal from the one or more global positioning system satellites into a current location of the navigation system. A route can be determined from a start location to a destination. The route can cover an on-the-route distance between the start location and the destination. A map image can be presented on the display. The map image can be indicative of the map data stored in the one or more memory devices. A start offset distance can be calculated, automatically, from the current location to the start location. A route distance icon can be presented on the display, automatically, when the current location is not coincident with the route and the start offset distance is less than a predetermined distance. The route distance icon can provide the on-the-route distance. A geodesic distance icon can be presented on the display, automatically, when the current location is not coincident with the route and the start offset distance is greater than the predetermined distance. The geodesic distance icon can provide a geodesic distance from the current location to the destination.

In another embodiment, a method for providing route guidance can include receiving a signal from one or more global positioning system satellites with a satellite antenna. The satellite antenna can be communicatively coupled to one or more processors. The signal from the one or more global positioning system satellites can be transformed into a current location of a navigation system. A route from a start location to a destination can be determined. The route can cover an on-the-route distance between the start location and the destination. A map image can be presented on a display communicatively coupled to the one or more processors. A start offset distance from the current location to the start location can be calculated, automatically with the one or more processors. A geodesic distance icon can be presented on the display, automatically with the one or more processors, when the current location is not coincident with the route and the start offset distance is greater than a predetermined distance. The geodesic distance icon can provide a geodesic distance from the current location to the destination and a directional indicator that points from the current location towards the destination.

In yet another embodiment, a vehicle may include one or more processors, input hardware, a display, a satellite antenna, one or more memory modules and map data. The input hardware can be communicatively coupled to the one or more processors. The display can be communicatively coupled to the one or more processors. The satellite antenna can be communicatively coupled to the one or more processors. The satellite antenna can receive a signal from one or more global positioning system satellites. The one or more memory modules can be communicatively coupled to the one or more processors. The map data can be stored in the one or more memory modules. The one or more processors execute machine readable instructions to transform the signal from the one or more global positioning system satellites into a current location of the vehicle. Input can be received from the input hardware. A start location and a destination can be determined based at least in part upon the input from the input hardware. A route can be determined from the start location to the destination. The route can cover an on-the-route distance between the start location and the destination. A map image can be presented on the display. The map image can be indicative of the map data stored in the one or more memory modules. A start offset distance from the current location to the start location can be calculated automatically. A route distance icon can be presented on the display, automatically, when the current location is not coincident with the route and the start offset distance is less than a predetermined distance. The route distance icon can provide the on-the-route distance and an on-the-route travel time. A geodesic distance icon can be presented on the display, automatically, when the current location is not coincident with the route and the start offset distance is greater than the predetermined distance. The geodesic distance icon can provide a geodesic distance from the current location to the destination and a directional indicator that points from the current location towards the destination.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
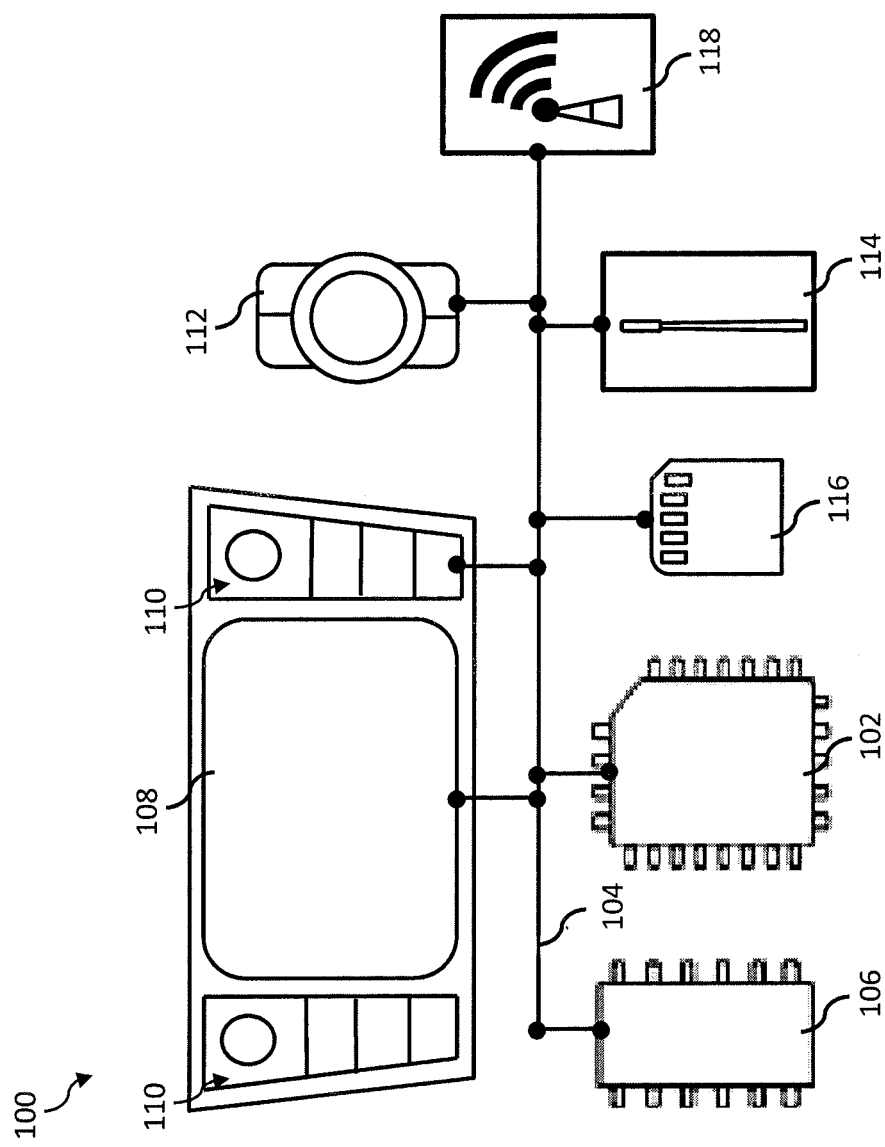
FIG. 1 schematically depicts a navigation system according to one or more embodiments shown and described herein.

FIG. 1 generally depicts one embodiment of a navigation system. The navigation system can include one or more processors that are communicatively coupled to a satellite antenna. The one or more processors can execute machine readable instructions to provide navigation functions based on map data stored in memory and global positioning satellite signals received by the satellite antenna. Moreover, the embodiments described herein may include functionality to identify situations where the map data is inaccurate or incomplete. The embodiments described herein can also provide a geodesic distance icon with navigational information to compensate for inaccurate or incomplete map data. Various embodiments of the navigation system and the operation of the navigation system will be described in more detail herein.

Referring now to FIG. 1, an embodiment of a navigation system 100 is schematically depicted. It is noted that, while the navigation system 100 is depicted in isolation, the navigation system 100 can be coupled to a vehicle (not depicted in the figures). The vehicle may be an automobile or any other passenger or non-passenger vehicle such as, for example, a terrestrial, aquatic, and/or airborne vehicle.

The navigation system 100 may include one or more processors 102. Each of the one or more processors 102 can be any device capable of executing machine readable instructions. Accordingly, each of the one or more processors 102 may be a controller, an integrated circuit, a microchip, a computer, or any other computing device. The one or more processors 102 can be coupled to a communication path 104 that provides signal interconnectivity between various vehicle modules of the navigation system. Accordingly, the communication path 104 can communicatively couple any number of processors with one another, and allow the modules coupled to the communication path 104 to operate in a distributed computing environment. Specifically, each of the modules can operate as a node that may send and/or receive data. As used herein, the term "communicatively coupled" means that coupled components are capable of exchanging data signals with one another such as, for example, electrical signals via conductive medium, electromagnetic signals via air, optical signals via optical waveguides, and the like.

Accordingly, the communication path 104 can be formed from any medium that is capable of transmitting a signal such as, for example, conductive wires, conductive traces, optical waveguides, or the like. Moreover, the communication path 104 can be formed from a combination of mediums capable of transmitting signals. In one embodiment, the communication path 104 can comprise a combination of conductive traces, conductive wires, connectors, and buses that cooperate to permit the transmission of electrical data signals to components such as processors, memories, sensors, input devices, output devices, and communication devices. Accordingly, the communication path 104 can comprise a vehicle bus, such as for example a LIN bus, a CAN bus, a VAN bus, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium.

The navigation system 100 may include one or more memory modules 106 coupled to the communication path 104. The one or more memory modules 106 may comprise RAM, ROM, flash memories, hard drives, or any device capable of storing machine readable instructions such that the machine readable instructions can be accessed by the one or more processors 102. The machine readable instructions can comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine readable instructions and stored on the one or more memory modules 106. Alternatively, the machine readable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

Referring still to FIG. 1, the navigation system 100 can comprise a display 108 for providing visual output such as, for example, maps, navigation, entertainment, information, or a combination thereof. The display 108 can be coupled to the communication path 104. Accordingly, the communication path 104 can communicatively couple the display 108 to other modules of the navigation system 100. The display 108 can include any medium capable of transmitting an optical output such as, for example, a cathode ray tube, light emitting diodes, a liquid crystal display, a plasma display, or the like. Moreover, the display 108 can be a touch screen that, in addition to providing optical information, detects the presence and location of a tactile input upon a surface of the display 108 or adjacent to the display 108. Accordingly, each display can receive mechanical input directly upon the optical output provided by the display. Additionally, it is noted that the display 108 can include at least one of the one or more processors 102 and the one or memory modules 106.

The navigation system 100 can comprise tactile input hardware 110 coupled to the communication path 104 such that the communication path 104 communicatively couples the tactile input hardware 110 to other modules of the navigation system 100. The tactile input hardware 110 can be any device capable of transforming mechanical, optical, or electrical input into a data signal capable of being transmitted with the communication path 104. Specifically, the tactile input hardware 110 can include any number of movable objects that each transform physical motion into a data signal that can be transmitted to over the communication path 104 such as, for example, a button, a switch, a knob, a microphone or the like. In some embodiments, the display 108 and the tactile input hardware 110 can be combined as a single module and operate as an audio head unit or an infotainment system. However, it is noted, that the display 108 and the tactile input hardware 110 can be separate from one another and operate as a single module by exchanging signals via the communication path 104.

The navigation system 100 can optionally comprise a peripheral tactile input 112 coupled to the communication path 104 such that the communication path 104 communicatively couples the peripheral tactile input 112 to other modules of the navigation system 100. For example, in one embodiment, the peripheral tactile input 112 can be located in a vehicle console to provide additional location for receiving input. The peripheral tactile input 112 operates in a manner substantially similar to the tactile input hardware 110, i.e., the peripheral tactile input 112 includes movable objects and transforms motion of the movable objects into a data signal that can be transmitted over the communication path 104.

The navigation system 100 can further comprise a satellite antenna 114 coupled to the communication path 104 such that the communication path 104 communicatively couples the satellite antenna 114 to other modules of the navigation system 100. The satellite antenna 114 is configured to receive signals from global positioning system satellites. Specifically, in one embodiment, the satellite antenna 114 can include one or more conductive elements that interact with electromagnetic signals transmitted by global positioning system satellites. The received signal can be transformed into a data signal indicative of the location (e.g., latitude and longitude) of the satellite antenna 114 or an object positioned near the satellite antenna 114, by the one or more processors 102. Additionally, it is noted that the satellite antenna 114 can include at least one of the one or more processors 102 and the one or memory modules 106.

In embodiments where the navigation system 100 is coupled to a vehicle, the one or more processors 102 can execute machine readable instructions to transform the signals received by the satellite antenna 114 into data indicative of the positioning of the vehicle with respect to road data, i.e., the vehicle position can be indicated on a map. The road data can be stored as machine readable instructions in the one or more memory modules 106. Alternatively or additionally, road data can be stored in a removable data module 116. Specifically, the removable data module 116 can be coupled to the communication path 104 via a socket with a movable attachment member such as, for example, a clasp, a detent, or the like. The movable attachment member can transition between states that apply varying amounts of force to the removable data module 116. Accordingly, the removable data module 116 can be optical media, solid state flash memory (e.g., USB or memory card), or a combination thereof.

The navigation system 100 can comprise network interface hardware 118 for communicatively coupling the navigation system 100 with a mobile device or a computer network. The network interface hardware 118 can be coupled to the communication path 104 such that the communication path 104 communicatively couples the network interface hardware 118 to other modules of the navigation system 100. The network interface hardware 118 can be any device capable of transmitting and/or receiving data via a wireless network. Accordingly, the network interface hardware 118 can include a communication transceiver for sending and/or receiving data according to any wireless communication standard. For example, the network interface hardware 118 may include a chipset (e.g., antenna, processors, machine readable instructions, etc.) to communicate over wireless computer networks such as, for example, wireless fidelity (Wi-Fi), WiMax, Bluetooth, IrDA, Wireless USB, Z-Wave, ZigBee, or the like.

The navigation system 100 can be formed from a plurality of modular units, i.e., the display 108, tactile input hardware 110, the peripheral tactile input, satellite antenna 114, removable data module 116, and network interface hardware 118 can be formed as modules that when communicatively coupled form the navigation system 100. Accordingly, in some embodiments, each of the modules can include at least one of the one or more processors 102 and/or the one or more memory modules 106. Accordingly, it is noted that, while specific modules may be described herein as including a processor and/or a memory module, the embodiments described herein can be implemented with the processors and memory modules distributed throughout various communicatively coupled modules.

Figure 2:
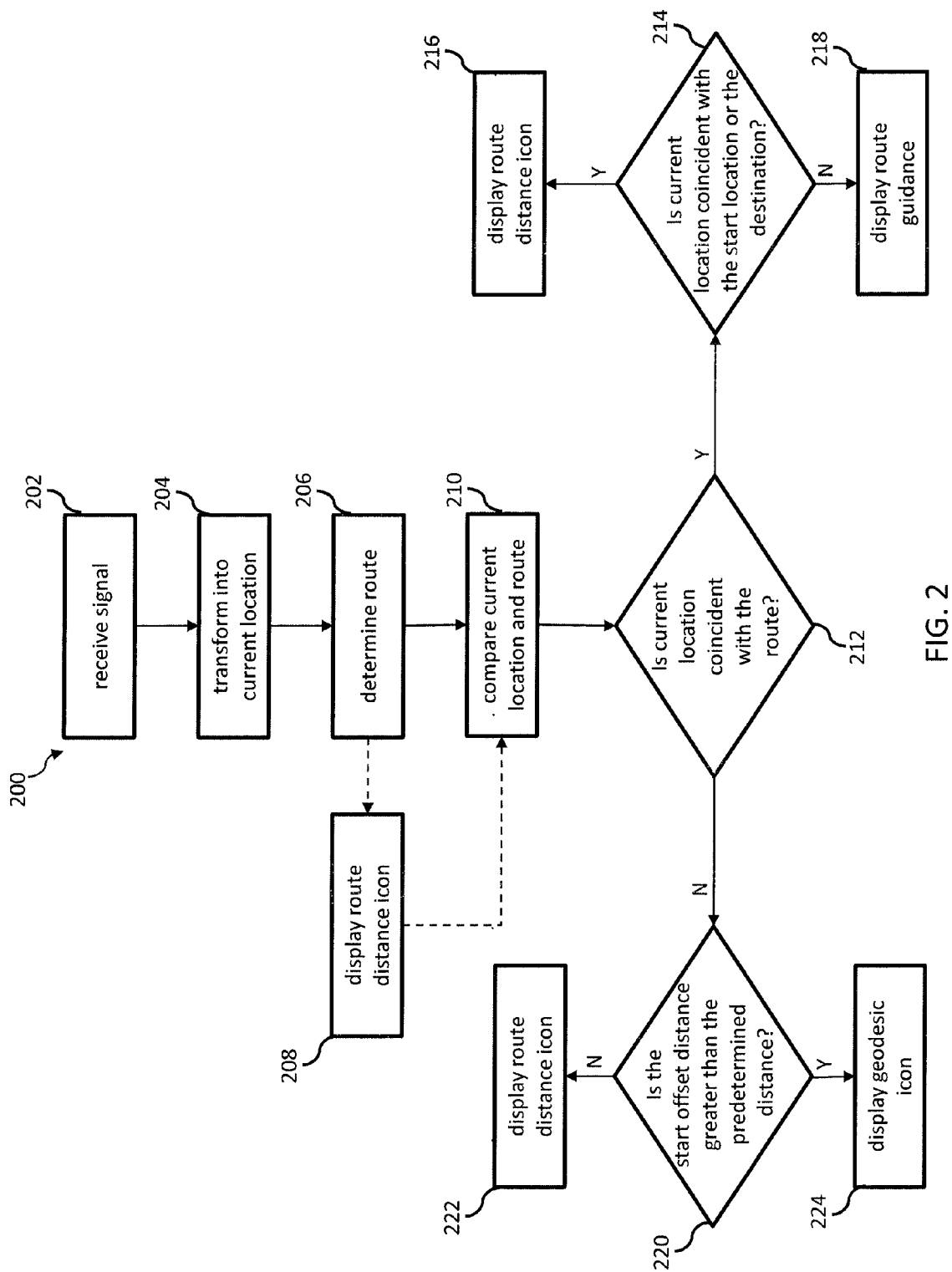
FIG. 2 schematically depicts a method according to one or more embodiments shown and described herein.

Referring now to FIG. 2, an embodiment of a method 200 for providing route guidance is schematically depicted. The method 200 can be implemented as logic within the machine readable instructions that, when executed, automatically provide route guidance functions. It is noted that, while the method 200 depicts processes following a specific sequence, additional embodiments of the present disclosure are not limited to any particular sequence.

Figure 3:
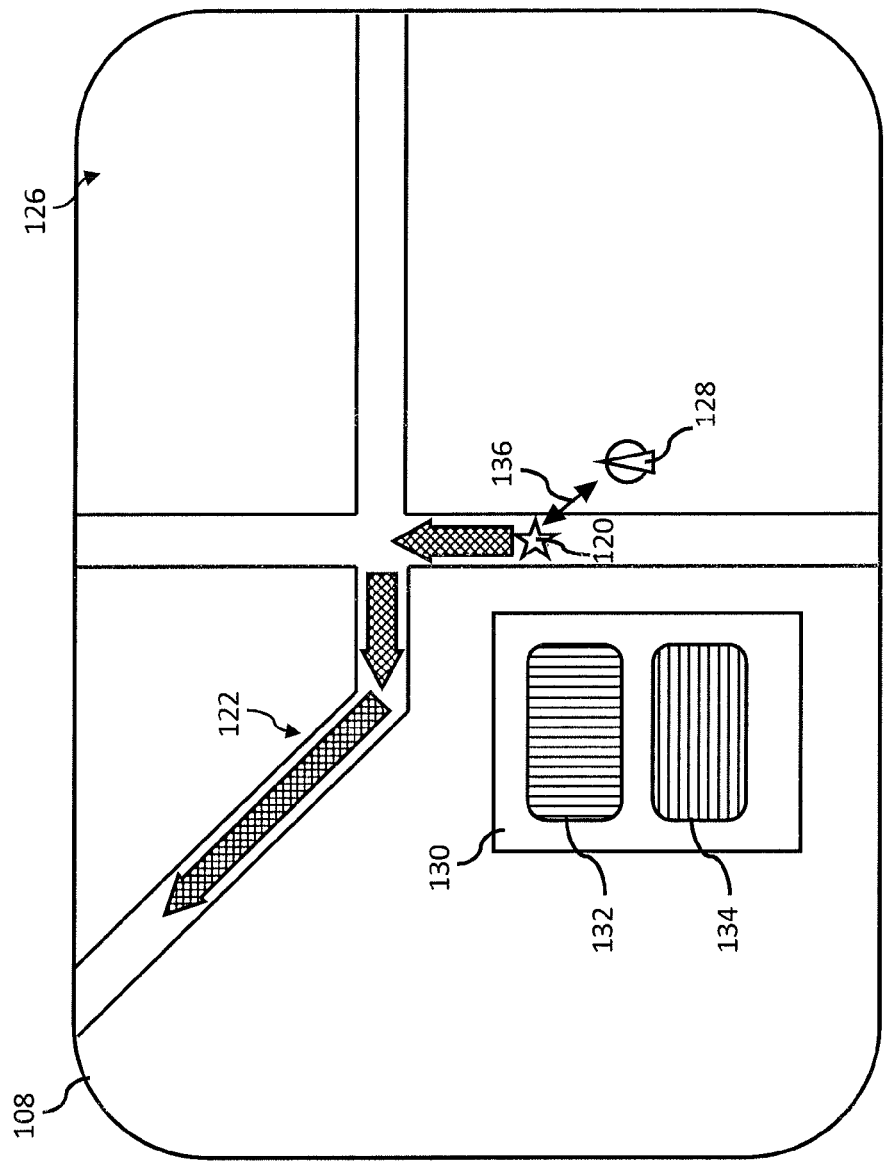
FIG. 3 schematically depicts a display according to one or more embodiments shown and described herein.
Figure 4:
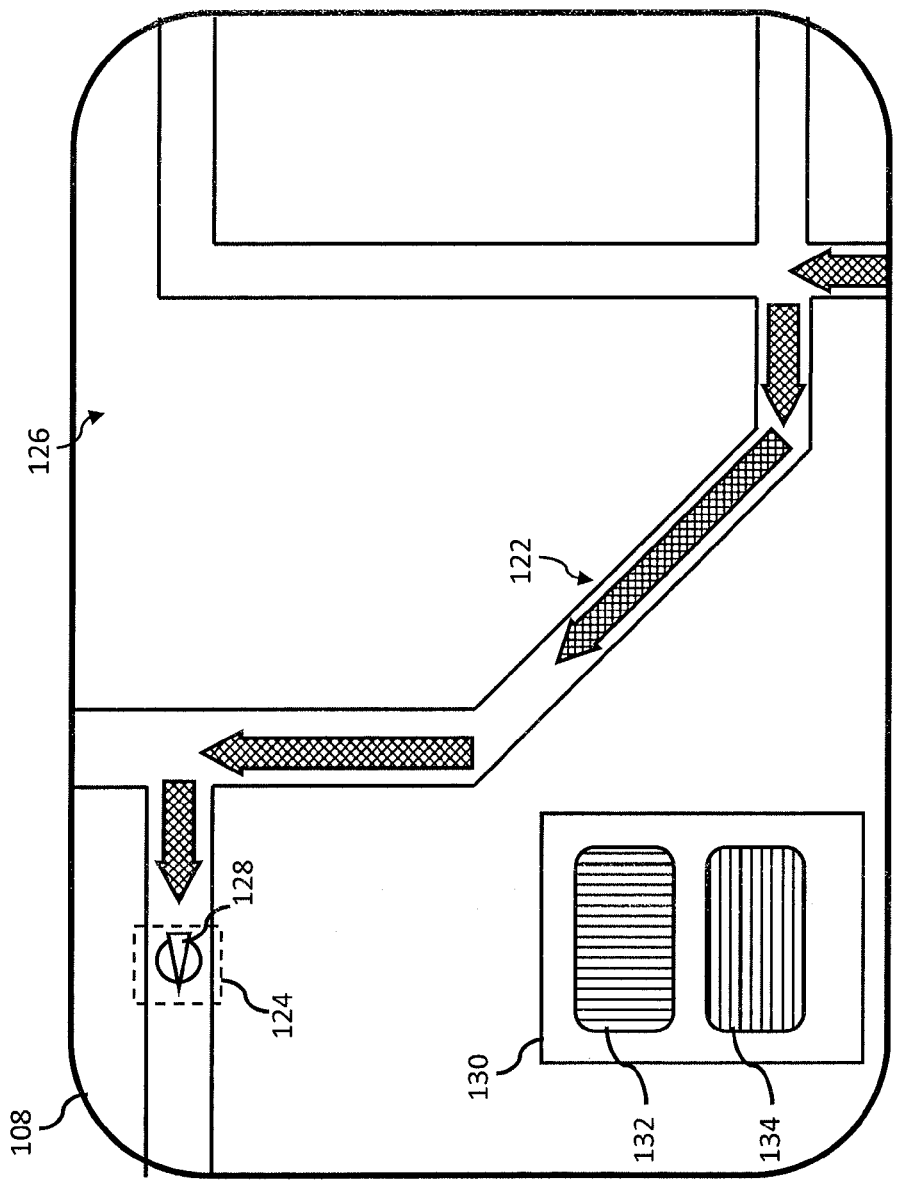
FIG. 4 schematically depicts a display according to one or more embodiments shown and described herein.

Referring collectively to FIGS. 1-3, at process 202, the satellite antenna 114 can receive a signal from one or more global positioning satellites. Specifically, the satellite antenna 114 can receive an electromagnetic signal with a conductive element. At process 204, the signal from the one or more global positioning satellites can be transformed into a data signal. In one embodiment, the electromagnetic signal can be converted into a signal capable of being transmitted over the communication path 104. For example, the satellite antenna 114 can include a chipset that transforms the received electromagnetic signal into a data signal that is capable of being interpreted by the one or more processors 102. Generally, the data signal is indicative of a current location 128 (e.g., a latitude and longitude) of the satellite antenna 114.

In further embodiments, the system 100 can be coupled to a vehicle (not depicted). Accordingly, the data signal can be indicative of the latitude and longitude of the vehicle. Specifically, the system 100 may determine vehicle position based upon the latitude and longitude of the satellite antenna 114 (e.g., unmodified from the received signal) or the vehicle position can be based upon the latitude and longitude of the satellite antenna 114 modified by further data. For example, the system 100 may include sensors (e.g., gyroscopes, accelerometers, or the like) configured to detect the heading and speed of the vehicle. Accordingly, the vehicle position can be based upon a combination of data including the detected speed, detected heading, detected latitude and longitude, and processing delay.

Referring still to FIGS. 1-3, at process 206, a start location 120, a route 122, and a destination 124 (FIG. 6) can be determined. The start location 120 and the destination 124 can be any position on that can be indexed to map data that can be stored within the one or more memory devices (e.g., the one or more memory modules 106 and/or the removable data module 116) of the system 100. Accordingly, the start location 120 and the destination 124 can each be an address, intersection of a road, latitude and longitude, or any other positional descriptor that can be indexed to the map data. In one embodiment, the system 100 may receive input via input hardware, which can include a touch screen, the tactile input hardware 110, the peripheral tactile input 112, or the like. The input can be indicative of a desired start location 120 and/or the destination 124, e.g., the locations can be entered directly or selected from a list.

The one or more processors 102 can determine the route 122 by executing the machine readable instructions. The machine readable instructions may include functions for determining a shortest route, a fastest route, or an optimal route that is based upon a number of factors such as, for example, traffic, road conditions, distance, speed limits, or the like. Generally, the route 122 traverses one or more roads, as identified by the map data, starting from the start location 120 and terminating at the destination 124.

The one or more processors 102 can automatically present a map image 126 on the display 108 that corresponds to the map data stored within the one or more memory devices (e.g., the one or more memory modules 106 and/or the removable data module 116). The start location 120 and the route 122 can be presented on the display 108 as an overlay on the map image 126. The method 200 can optionally proceed from process 206 to process 208 or process 210. At process 208, a route distance icon 130 can be presented on the display 108 as an overlay on the map image 126. In one embodiment, the route distance icon 130 can be presented, upon determination of the route 122, for a brief period of time such as, for example, less than about 30 seconds in one embodiment, or less than about 15 seconds in another embodiment. Moreover, the method 200 may delay proceeding from process 208 until the brief period of time expires to, for example, provide a summary of the route 122.

Referring now to FIG. 3, the route distance icon 130 can be configured to provide a summary of the route 122. Accordingly, the route distance icon 130 can include a travel distance icon 132 for displaying an on-the-route distance and a travel time icon 134 for displaying an on-the-route travel time. The on-the-route distance can be determined by totaling the total distance traversed by the route 122. The on-the-route travel time can be determined by estimating speed that the route 122 can be travelled. Specifically, the on-the-route travel time can be determined by dividing the on-the-route distance by an average speed limit encountered along the route 122. The average speed limit can be determined in any manner that suitably approximates the speed a vehicle can travel on average over the entirety of the route 122. In one embodiment, the average speed limit can be determined by averaging known speed limits for each road along the route 122, which may or may not include weighting the speed limits by the distance that each of the speed limits is applicable over the route 122. The known speed limits can be associated with the map data and stored in one of the memory devices. In alternative embodiments, the average speed limit can be determined by averaging the current speed of other vehicles traveling along the route 122, which can be detected by speed sensing systems and provided in real time via the network interface hardware 118 (FIG. 1).

Referring collectively to FIGS. 1-4, at process 210, the current location 128 can be compared with the route 122. The current location 128 can be provided on the display 108 as an icon that is overlaid upon the map image 126 at a position that corresponds to the current location 128. The one or more processors 102 can automatically determine the relationship between the start location 120, the route 122, and the destination 124 and the current location 128. Specifically, the one or more processors 102 can automatically determine if the current location 128 is coincident with the route 122, which includes the start location 120 and the destination 124. The one or more processors 102 can also automatically determine a start offset distance 136. The start offset distance 136 corresponds to the geodesic distance between the start location 120 and the current location 128. As used herein the term "geodesic" generally refers to the shortest route between two points along the surface of the earth. Any of the geodesic distances described herein can be determined by including details regarding the topography encountered between the two points or the geodesic distance can be determined based upon the straight line distance between two points using the map data (i.e., without considering topography).

Figure 5:
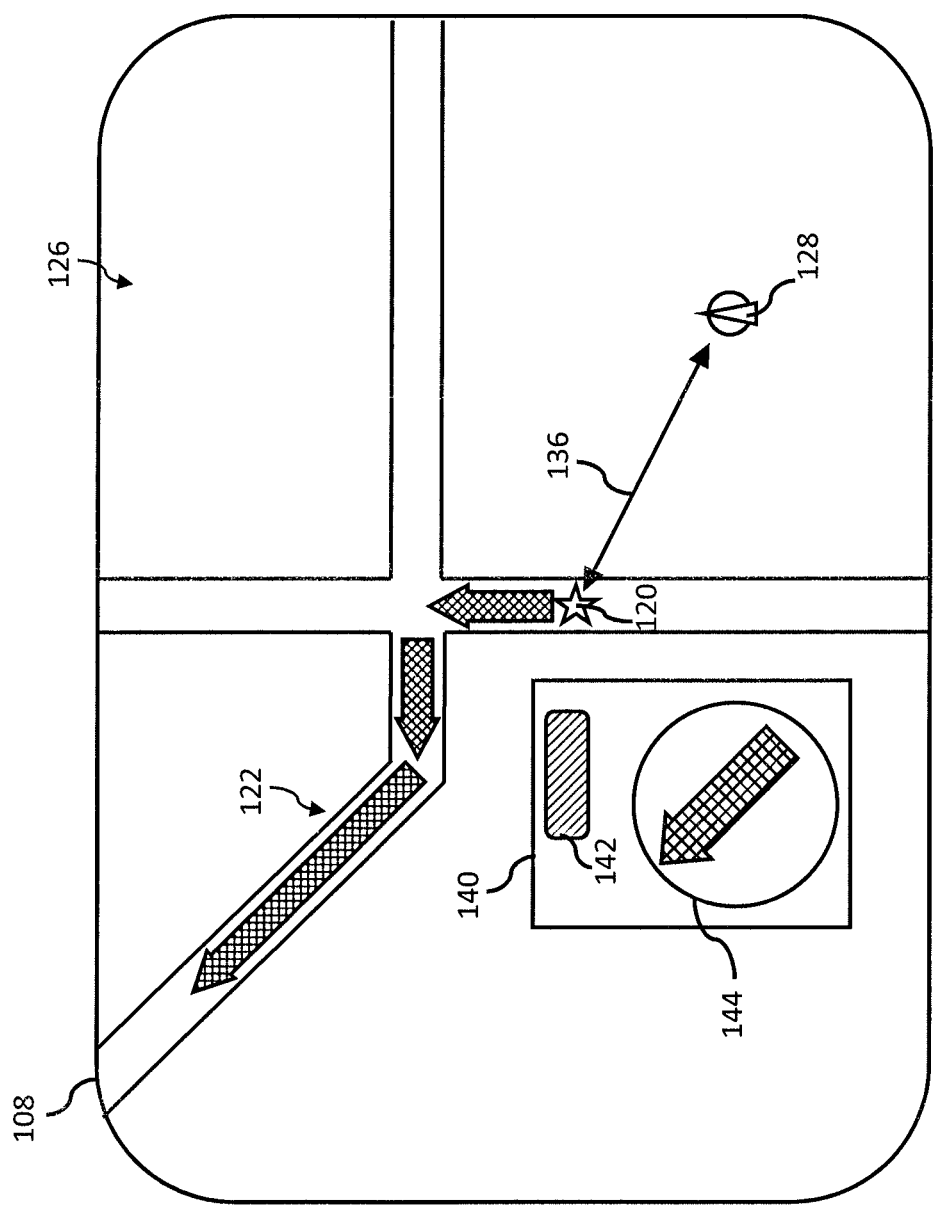
FIG. 5 schematically depicts a display according to one or more embodiments shown and described herein.

At process 212, the one or more processors 102 can automatically determine if the current location 128 is coincident with the route 122. When the current location 128 is coincident with the route 122, the method 200 can proceed to process 214. At process 214, the one or more processors 102 can automatically determine if the current location 128 is coincident with the start location 120 or the destination 124. When the current location 128 is coincident with the start location 120 or the destination 124, the method 200 can proceed to process 216. At process 216, the route distance icon 130 can be presented on the display 108 as an overlay on the map image 126. Returning to process 214, when the current location 128 is not coincident with the start location 120 or the destination 124, the method 200 can proceed to process 218. At process 218, route guidance can be provided. Alternatively or additionally, the route distance icon 130 and a geodesic distance icon 140 (FIG. 5) can be deactivated. In some embodiments, the route guidance can be provided on the display 108 and audibly as turn-by-turn navigation instructions.

Returning to process 212, when the current location 128 is not coincident with the route 122, the method 200 can proceed to process 220. At process 220, the one or more processors 102 can automatically determine if the start offset distance 136 is greater than a predetermined distance. The predetermined distance can be a distance that is relatively equivalent to an average distance that a vehicle is away from the start location 120, which can correspond to an address along a roadway in the map data, when the route 122 is determined. For example, a vehicle can be off of the roadway in the map data (e.g., a driveway or a parking lot) when the route 122 is determined by the one or more processors 102. Accordingly, the predetermined distance can be less than about 1 mile (about 1.6 km) such as, for example, about 0.5 miles (about 0.8 km) in one embodiment, or about 0.25 miles (about 0.4 km) in another embodiment.

Referring collectively to FIGS. 1-3, when the start offset distance 136 is not greater than the predetermined distance, the method 200 can proceed to process 222 from process 220. At process 222, the one or more processors 102 can automatically present the route distance icon 130 on the display 108 as an overlay on the map image 126.

Reference is now made to FIGS. 1, 2, 4 and 5. Returning to process 220, when the start offset distance 136 is greater than the predetermined distance, the method 200 can proceed to process 224. At process 224, the one or more processors 102 can automatically present the geodesic distance icon 140 on the display 108 as an overlay on the map image 126. The geodesic distance icon 140 provides general guidance from the current location 128 to the destination 124. In one embodiment, the geodesic icon comprises a distance icon 142 that indicates a geodesic distance from the current location 128 to the destination 124. Alternatively or additionally, the geodesic icon can comprise a directional indicator 144 that points substantially along a directional vector from the current location 128 to the destination 124. For example, the directional indicator 144 can be an arrow pointing along the cardinal direction or intermediate direction that most nearly approximates the directional vector such as, for example, north, east, south, west, north-east, south-east, south-west, north-west, or the like. Moreover, the directional indicator 144 can include heading data providing a numerical indication of the directional vector.

It should now be understood that the embodiments described herein relate to systems, methods, and vehicles for providing geodesic distances and directional information from a current location to a destination. Accordingly, in instances where map data is incomplete, the embodiments described herein can be utilized to provide supplemental information. For example, the start location and destination information can be provided to a navigation system, while a vehicle comprising the navigation system is in an unmapped location. After the route is calculated, different information can be displayed depending the distance between the vehicle and the start location. For example, if the vehicle is in an unmapped location that is greater than a predetermined distance away from the start location, a geodesic distance and a directional indicator can be provided that provide information with respect to the destination. Thus, the embodiments described herein can be utilized to navigate towards the destination with outdated or incomplete map data.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A navigation system comprising:
   one or more processors;
   a display communicatively coupled to the one or more processors;
   a satellite antenna communicatively coupled to the one or more processors, wherein the satellite antenna receives a signal from one or more global positioning system satellites;
   one or more memory devices communicatively coupled to the one or more processors; and
   map data stored in the one or more memory devices, wherein the one or more processors execute machine readable instructions to:
      transform the signal from the one or more global positioning system satellites into a current location of the navigation system;
      determine a route from a start location to a destination, wherein the route covers an on-the-route distance between the start location and the destination;
      present a map image on the display, wherein the map image is indicative of the map data stored in the one or more memory devices;
      calculate, automatically, a start offset distance from the current location to the start location;
      present a route distance icon on the display, automatically, when the current location is not coincident with the route and the start offset distance is less than a predetermined distance, wherein the route distance icon provides the on-the-route distance; and
      present a geodesic distance icon on the display, automatically, when the current location is not coincident with the route and the start offset distance is greater than the predetermined distance, wherein the geodesic distance icon provides a geodesic distance from the current location to the destination.

2. The system of claim 1, wherein the one or more processors execute machine readable instructions to:
   receive input indicative of the destination or the start location from input hardware communicatively coupled to the one or more processors.

3. The system of claim 1, wherein the one or more processors execute machine readable instructions to:
   present the route distance icon on the display, automatically, immediately after the route is determined; and
   remove the route distance icon from the display, automatically, after a period of time has elapsed.

4. The system of claim 3, wherein the period of time is less than about 30 seconds.

5. The system of claim 1, wherein the one or more processors execute machine readable instructions to:
   provide turn-by-turn navigation on the display; and
   deactivate the route distance icon and the geodesic distance icon, automatically, while the turn-by-turn navigation is provided.

6. The system of claim 1, wherein the one or more processors execute machine readable instructions to:
   present the route distance icon on the display, automatically, when the current location is coincident with the destination.

7. The system of claim 1, wherein the one or more memory devices comprises a removable memory module.

8. The system of claim 1, wherein the display is a touch screen.

9. The system of claim 1, wherein the route distance icon provides an on-the-route travel time.

10. The system of claim 1, wherein the start offset distance is geodesic.

11. The system of claim 10, wherein the start offset distance is less than about 1 mile.

12. The system of claim 1, wherein the geodesic distance icon comprises a directional indicator that points substantially along a directional vector from the current location to the destination.

13. The system of claim 12, wherein the directional indicator points along a cardinal direction or intermediate direction.

14. A method for providing route guidance comprising:
   receiving a signal from one or more global positioning system satellites with a satellite antenna, wherein the satellite antenna is communicatively coupled to one or more processors;
   transforming the signal from the one or more global positioning system satellites into a current location of a navigation system;
   determining a route from a start location to a destination, wherein the route covers an on-the-route distance between the start location and the destination;
   presenting a map image on a display communicatively coupled to the one or more processors;
   calculating, automatically with the one or more processors, a start offset distance from the current location to the start location; and
   presenting a geodesic distance icon on the display, automatically with the one or more processors, when the current location is not coincident with the route and the start offset distance is greater than a predetermined distance, wherein the geodesic distance icon provides a geodesic distance from the current location to the destination and a directional indicator that points from the current location towards the destination.

15. The method of claim 14, further comprising:
   presenting a route distance icon on the display, automatically with the one or more processors, when the current location is not coincident with the route and the start offset distance is less than the predetermined distance, wherein the route distance icon provides an on-the-route travel time.

16. The method of claim 15, wherein the route distance icon provides the on-the-route distance.

17. The method of claim 15, further comprising:
providing turn-by-turn navigation on the display; and
deactivating the route distance icon and the geodesic distance icon, automatically with the one or more processors, while the turn-by-turn navigation is provided.

18. The method of claim 14, further comprising:
presenting a route distance icon on the display, automatically with the one or more processors, immediately after the route is determined, wherein the route distance icon provides the on-the-route distance; and
removing the route distance icon from the display, automatically with the one or more processors, after a period of time has elapsed.

19. The method of claim 18, wherein the route distance icon provides an on-the-route travel time.

20. A vehicle comprising:
one or more processors;
input hardware communicatively coupled to the one or more processors;
a display communicatively coupled to the one or more processors;
a satellite antenna communicatively coupled to the one or more processors, wherein the satellite antenna receives a signal from one or more global positioning system satellites;
one or more memory modules communicatively coupled to the one or more processors; and
map data stored in the one or more memory modules, wherein the one or more processors execute machine readable instructions to:
transform the signal from the one or more global positioning system satellites into a current location of the vehicle;
receive input from the input hardware;
determine a start location and a destination based at least in part upon the input from the input hardware;
determine a route from the start location to the destination, wherein the route covers an on-the-route distance between the start location and the destination;
present a map image on the display, wherein the map image is indicative of the map data stored in the one or more memory modules;
calculate, automatically, a start offset distance from the current location to the start location;
present a route distance icon on the display, automatically, when the current location is not coincident with the route and the start offset distance is less than a predetermined distance, wherein the route distance icon provides the on-the-route distance and an on-the-route travel time; and
present a geodesic distance icon on the display, automatically, when the current location is not coincident with the route and the start offset distance is greater than the predetermined distance, wherein the geodesic distance icon provides a geodesic distance from the current location to the destination and a directional indicator that points from the current location towards the destination.

* * * * *